US009176551B2

(12) United States Patent
Min et al.

(10) Patent No.: US 9,176,551 B2
(45) Date of Patent: Nov. 3, 2015

(54) WIRELESS POWER TRANSMISSION APPARATUS AND METHOD OF TRANSMITTING WIRELESS POWER USING THE SAME

(71) Applicant: SAMSUNG ELECTRO-MECHANICS CO., LTD., Suwon-si (KR)

(72) Inventors: Jun Ki Min, Suwon-si (KR); Hyun Seok Lee, Seoul (KR); Eung Ju Kim, Suwon-si (KR); Kwang Du Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 325 days.

(21) Appl. No.: 13/738,746

(22) Filed: Jan. 10, 2013

(65) Prior Publication Data

US 2013/0181664 A1  Jul. 18, 2013

(30) Foreign Application Priority Data

Jan. 13, 2012  (KR) ........................ 10-2012-0004405

(51) Int. Cl.
*G06F 1/26* (2006.01)
*H02J 7/00* (2006.01)
*H04B 5/00* (2006.01)
*H02J 5/00* (2006.01)

(52) U.S. Cl.
CPC . *G06F 1/26* (2013.01); *H02J 5/005* (2013.01); *H02J 7/0052* (2013.01); *H04B 5/0037* (2013.01); *H04B 5/0087* (2013.01)

(58) Field of Classification Search
CPC .................................. G06F 1/26; H02J 5/005
USPC .................... 713/300; 307/104; 455/273, 573
See application file for complete search history.

(56) References Cited

U.S. PATENT DOCUMENTS

| 8,217,621 | B2* | 7/2012 | Tsai et al. | 320/108 |
| 8,890,470 | B2* | 11/2014 | Partovi | 320/108 |
| 2006/0119426 | A1* | 6/2006 | Ichitsubo et al. | 330/66 |
| 2009/0284082 | A1* | 11/2009 | Mohammadian | 307/104 |
| 2010/0184371 | A1* | 7/2010 | Cook et al. | 455/41.1 |
| 2010/0244580 | A1* | 9/2010 | Uchida et al. | 307/104 |
| 2012/0146425 | A1* | 6/2012 | Lee et al. | 307/104 |
| 2012/0149301 | A1* | 6/2012 | Wiley | 455/41.1 |

(Continued)

FOREIGN PATENT DOCUMENTS

KR  10-2007-0078889 A  8/2007

*Primary Examiner* — Chun Cao
(74) *Attorney, Agent, or Firm* — NSIP Law

(57) ABSTRACT

Provided are an apparatus and a method for transmitting wireless power. According to an embodiment of the present invention, a wireless power transmission apparatus includes: a switching block receiving distributed power signals and delivering the power signals as periodical preamble signals that make a detour around a power amplification and transmission block or delivering the power signals to the power amplification and transmission block; the power amplification and transmission block amplifying the power signals and transmitting the power signals to a coil array block; a sensing block detecting the preamble signals on the respective paths that are delivered to the coil array block, and sensing changes in the preamble signals according to whether wireless power receiving apparatuses appear; and a power distribution and control block controlling the switching block according to sensing results to transmit the power signals to the power amplification and transmission block.

18 Claims, 3 Drawing Sheets

(56) References Cited

U.S. PATENT DOCUMENTS

| | | | |
|---|---|---|---|
| 2012/0157019 A1* | 6/2012 | Li | 455/127.1 |
| 2012/0313445 A1* | 12/2012 | Park et al. | 307/104 |
| 2013/0069585 A1* | 3/2013 | Kamata | 320/108 |
| 2013/0076306 A1* | 3/2013 | Lee et al. | 320/108 |

* cited by examiner

WIRELESS POWER TRANSMISSION APPARATUS AND METHOD OF TRANSMITTING WIRELESS POWER USING THE SAME

CROSS-REFERENCE TO RELATED APPLICATIONS

This application claims the benefit of Korean Patent Application No. 10-2012-0004405 filed with the Korea Intellectual Property Office on Jan. 13, 2012, the disclosure of which is incorporated herein by reference.

BACKGROUND OF THE INVENTION

1. Field of the Invention

The present invention relates to an apparatus and a method for transmitting wireless power, and more particularly, to an apparatus and a method for effectively transmitting wireless power, which control power signal transmission by detecting level changes in preamble signals that are not amplified with power on respective paths of a coil array block having a plurality of transmission coil arrays.

2. Description of the Related Art

Although wireless communication technology has undergone remarkable progress, there is still a need for development. In the case of representative cellular phones in an Information Technology (IT) field, information may be freely and wirelessly delivered, however, its power source still supplies power in a wired manner or through a charged battery. Wireless charging technology has been developed, but still remains at an insignificant level.

Wireless power transmission technology includes electromagnetic induction and magnetic resonance. In the electromagnetic induction method, a power transmission coil and a power reception coil are inductively coupled to each other with a distance of several millimeters (mm) therebetween to deliver energy by means of electromagnetic induction. The electromagnetic induction method may be applied to electric toothbrushes, cellular phone chargers or the like as products that are already put into practical use. In the magnetic resonance method, two dielectric resonators or coil resonators having the same resonance frequency are disposed close to each other to wirelessly transmit the power by means of resonance. This method has developed at a slower pace than the electromagnetic induction method.

In wireless charging systems using the conventional wireless power transmission technology, in order to enhance the efficiency of the system having a multi-coil array structure where multi-charging can be performed, the power is transmitted to the coils where power receiving apparatuses are present by determining the presence of the power receiving apparatuses. Here, determining the presence of the power receiving apparatuses may include receiving a feedback response from a battery being charged by sequentially driving the transmission coils.

Since this method sequentially drives the transmission coils, a delay time increases when several coils are sequentially sensed in the case of the multi-coil array.

In addition, all transmission coils are sequentially driven in order to determine the presence of the power receiving apparatuses, and a great deal of power must be consumed to recognize the presence of the power receiving apparatuses.

Further, in order to make a determination from the received feedback response from the battery being charged, separate communication means for communicating with the battery may be required.

SUMMARY OF THE INVENTION

The present invention has been invented in order to overcome the above-described problems and it is therefore an object of the present invention to provide a technique that enables the wireless power transmission apparatus using the multi-coil array to rapidly recognize several wireless power receiving apparatuses and efficiently operate to minimize power consumption.

In accordance with one aspect of the present invention to achieve the object, there is provided a wireless power transmission apparatus, which includes: a switching block having a plurality of switches, receiving distributed power signals, and delivering the power signals as periodical preamble signals that make a detour around a power amplification and transmission block or delivering the power signals to the power amplification and transmission block in accordance with switching under control; the power amplification and transmission block amplifying the power signals received through the switching block on respective paths and transmitting the amplified power signals to a coil array block; a sensing block detecting the preamble signals on the respective paths that make a detour around the power amplification and transmission block and are delivered to the coil array block, and sensing changes in the preamble signals according to whether wireless power receiving apparatuses receiving the wireless power from the coil array block appear; and a power distribution and control block controlling the preamble signals to be periodically transmitted to the respective paths through the switching block, and controlling the switching block, on the paths where the wireless power receiving apparatuses appear, according to sensing results received from the sensing block to transmit the power signals to the power amplification and transmission block.

Here, in an embodiment, the apparatus may further include a driving amplification block disposed between the power distribution and control block and the switching block for amplifying and transmitting the power signals distributed from the power distribution and control block.

In an embodiment, the apparatus may further include a coil array block wirelessly transmitting, to the wireless power receiving apparatuses, the power signals received from the power amplification and transmission block and the received preamble signals that make a detour around the power amplification and transmission block.

Here, in an embodiment, the coil array block may include a plurality of transmission coils, and the transmission coils are electromagnetically coupled with reception coils of the wireless power receiving apparatuses on the respective paths to wirelessly transmit the power signals.

In an embodiment, the power amplification and transmission block may include: a plurality of power amplifiers that amplify the power signals received through the switches of the switching block on the respective paths; and a plurality of matching circuits that transmit, with a low loss, the signals amplified by the respective power amplifiers to the coil array block through the respective paths.

In an embodiment, the power distribution and control block may include: a power distributor that distributes powers of a power source and transmits the powers to the switches of the switching block on the respective paths; and a signal adjustment unit controlling the power signals distributed from the power distributor to be transmitted as the preamble signals that make a detour around the power amplification and transmission block through the switching block at the time of initially broadcasting the preamble signals, controlling the switches of the switching block, on the paths where the wireless power receiving apparatuses appear, to transmit the power signals distributed from the power distributor to the power amplification and transmission block through the corresponding paths in accordance with the sensing results received from the sensing block, and controlling the switches of the switching block, on the paths where the wireless power receiving apparatuses do not appear, to prevent the power signals from being transmitted to the power amplification and transmission block through the corresponding paths.

Here, in an embodiment, the signal adjustment unit may switch to a wireless power transmission mode by turning on the switches for power input of the switching block on the paths where the wireless power receiving apparatuses appear and a bias power source for power amplification of the power amplification and transmission block, and may keep a sleep mode by turning off the switches for power input of the switching block on the paths where the wireless power receiving apparatuses do not appear and the bias power source for power amplification of the power amplification and transmission block, in accordance with the sensing results from the broadcast preamble signals.

Here, in an embodiment, the signal adjustment unit may control the preamble signals to make a detour around the power amplification and transmission block through the switching block and to be transmitted while keeping the switches for power input of the switching block on the paths where the wireless power receiving apparatuses do not appear in an off state in accordance with the sensing results from the broadcast preamble signals.

In an embodiment, the sensing block may be disposed on each path that are common to the paths of the preamble signals that make a detour around the power amplification and transmission block and are delivered to the coil array block and the paths of the power signals that are amplified by the power amplification and transmission block and delivered to the coil array block, and may detect the changes in preamble signals or power signals delivered to the coil array block on the respective paths, and the signal adjustment unit may determine the charge progress state of the wireless power receiving apparatuses on the corresponding paths in accordance with the changes in power signals detected by the sensing block with respect to the paths switched to the wireless power transmission mode, and may switch to the sleep mode by turning off the switches for power input of the switching block on the corresponding paths and the bias power source for power amplification of the power amplification and transmission block at the time of charge completion.

Here, in an embodiment, the signal adjustment unit may assign temporary identifiers (IDs) to the coil array block, determine the sensing results of the broadcast preamble signals for each of the temporary IDs and controls a display apparatus to display whether the mode needs to be switched to the wireless mode transmission mode, and control the display apparatus to display the reception state or charge progress state of the wireless power receiving apparatuses in accordance with the sensing results for each of the temporary IDs with respect to the paths switched to the wireless power transmission mode.

In accordance with another aspect of the present invention to achieve the object, there is provided a method of transmitting wireless power, which includes: (a) inputting, under control, distributed power signals to a switching block having a plurality of switches, and transmitting the power signals as periodical preamble signals on detour paths that make a detour around power amplification paths; (b) detecting the preamble signals that are delivered to a coil array block having transmission coils for wireless power transmission through the detour paths, and sensing changes in preamble signals in accordance with whether wireless power receiving apparatuses receiving the wireless power from the coil array block appear; (c) controlling the switching block on the paths where wireless power receiving apparatuses appear, in accordance with the changes in sensed preamble signals, transmitting the power signals input to the switching block to the power amplification paths, amplifying the power signals on the power amplification paths, and transmitting the amplified power signals to the coil array block; and (d) performing, by the coil array block, wireless power transmission.

Here, in an embodiment, the method may further include driving-amplifying the power signals before the power signals are input to the switches of the switching block in (a) and (c).

In an embodiment, amplifying and transmitting the power signals in (c) may include: (c-1) amplifying, by power amplifiers on the respective paths, the power signals transmitted from the switches of the switching block on the respective paths to the power amplification paths; and (c-2) transmitting the amplified signals with a low loss to the coil array block through matching circuits on the respective paths.

In an embodiment, the method may further include (a-0) transmitting the power signals distributed from a power source to the switches of the switching block on the respective paths, wherein (c) may include: (c1) controlling the switches of the switching block, on the paths where the wireless power receiving apparatuses appear, to transmit the power signals to the power amplification paths through the corresponding paths, in accordance with the changes in sensed preamble signals; and (c2) controlling the switches of the switching block, on the paths where the wireless power receiving apparatuses do not appear, to prevent the power signals from being transmitted to the power amplification paths, in accordance with the changes in sensed preamble signals.

Here, in an embodiment, in (c1), a mode may be switched to a wireless power transmission mode by turning on the switches for power input of the switching block on the paths where the wireless power receiving apparatuses appear and a bias power source for power amplification on the power amplification paths, and in (c2), a sleep mode may be maintained by turning off the switches for power input of the switching block on the paths where the wireless power receiving apparatuses do not appear and the bias power source for power amplification on the power amplification paths.

Here, in an embodiment, in (c2), the switches for power input of the switching block on the paths where the wireless power receiving apparatuses do not appear may be kept in an off state while the preamble signals make a detour around the power amplification paths through the switching block and are transmitted.

In an embodiment, (c1) may include: with respect to the paths switched to the wireless power transmission mode, (c1-a) inputting the distributed power signals to the switching block having the switches and transmitting the power signals to the power amplification paths in accordance with switching to the wireless power transmission mode; (c1-b) detecting the power signals delivered to the coil array block having the transmission coils through the power amplification paths, and sensing the changes in power signals in accordance with the reception state of the wireless power receiving apparatuses receiving the wireless power from the coil array block on the corresponding paths; and (c1-c) determining the charge progress state of the wireless power receiving apparatuses on the corresponding paths in accordance with the changes in sensed power signals, and switching to the sleep mode by turning off the switches for power input of the switching block on the corresponding paths and the bias power source for power amplification on the power amplification paths at the time of charge completion.

In an embodiment, in (c), the sensing results of the broadcast preamble signals for each of temporary IDs assigned to the coil array block may be determined to display whether the mode needs to be switched to the wireless power transmission mode in (c1), and the reception state or charge progress state of the wireless power receiving apparatuses according to the changes in sensed power signals for each of the temporary IDs in (c1-c) may be displayed with respect to the paths switched to the wireless power transmission mode in (c1).

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
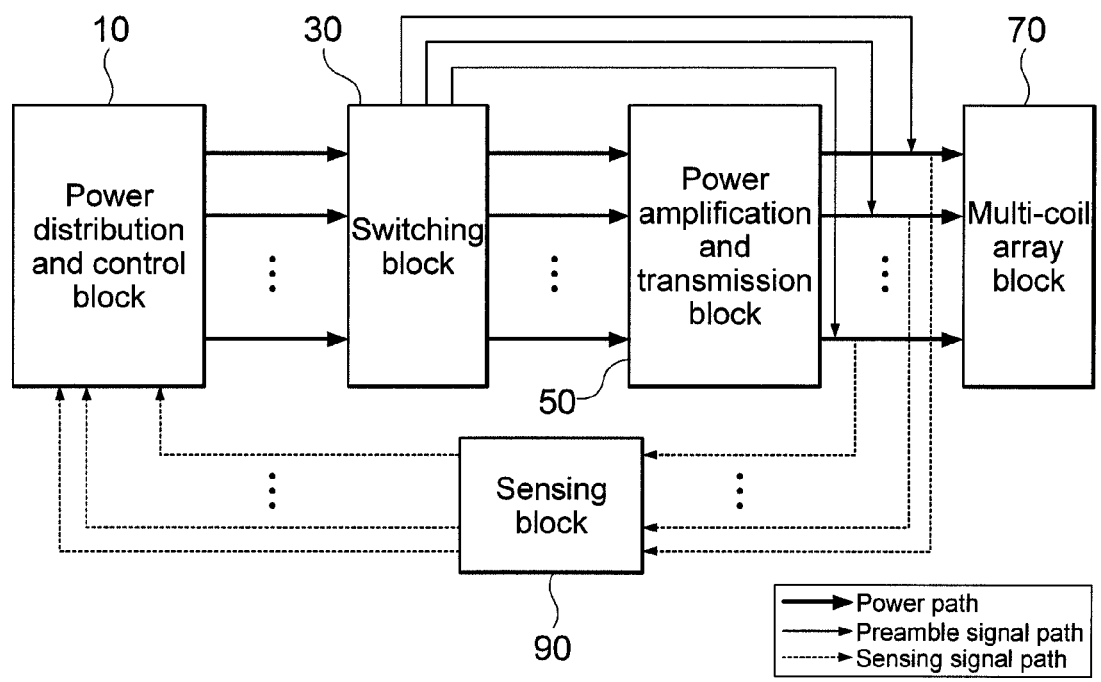
FIG. 1 is a block diagram schematically illustrating a wireless power transmission apparatus in accordance with an embodiment of the present invention.

Hereinafter, exemplary embodiments of the present invention will be described with reference to the accompanying drawings.

The following embodiments are provided as examples to fully convey the spirit of the invention to those skilled in the art. In the present description, like numerals refer to like configurations, and parts not relating to the description may be omitted to help understanding of the present invention.

It will be understood that when an element or layer used herein is not referred to as being "directly" connected to, coupled to, or disposed with respect to another element or layer, it may be directly connected to, coupled to, or disposed with respect to the another element or layer, or intervening elements or layers may be present therebetween. In addition, it will be understood that terms including the meaning of "contact" such as "on," "above," "below," and "beneath" may also be applied in the same manner. When a referential element is turned over or its direction is changed, terms indicating directions may be interpreted as ones containing relative directions corresponding to the directions.

It should be noted that, although singular terms "a," "an" and "the" are used herein, the forms may be used as a representative concept for the whole plural configuration terms unless the singular terms are contrary to the concept of the present invention, obviously different, or interpreted contradictorily. It will be understood that the terms "comprises," "having," "has," or "consists of," when used herein, specify the presence of stated components, motions, and/or devices, but do not preclude the presence or addition of one or more other components, motions, and/or devices thereof.

A wireless power transmission apparatus according to a first embodiment of the present invention will be described in detail with reference to accompanying drawings. Here, reference numerals that are not indicated in the referred drawings may be those indicating the same configuration in other drawings.

Figure 2:
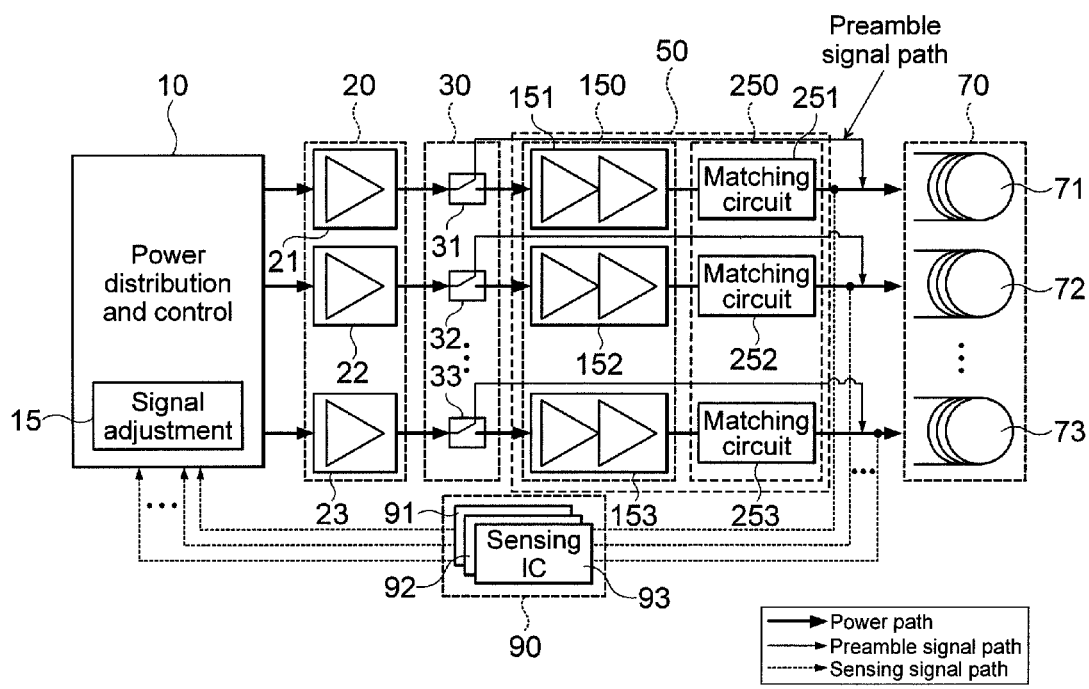
FIG. 2 is a diagram schematically illustrating a wireless power transmission apparatus in accordance with an embodiment of the present invention.

FIG. 1 is a block diagram schematically illustrating a wireless power transmission apparatus in accordance with an embodiment of the present invention, and FIG. 2 is a diagram schematically illustrating a wireless power transmission apparatus in accordance with an embodiment of the present invention.

First, referring to FIG. 1, the wireless power transmission apparatus according to an embodiment of the present invention may include a switching block 30, a power amplification and transmission block 50, a sensing block 90 and a power distribution and control block 10.

In FIGS. 1 and 2, the switching block 30 includes a plurality of switches 31, 32 and 33. Referring to FIG. 2, the switches 31, 32 and 33 disposed on respective paths may be switched to deliver preamble signals by making a detour around the power amplification and transmission block 50 or to transmit power signals for wireless power transmission to the power amplification and transmission block 50.

In other words, the switching block 30, under control, may receive distributed power signals and deliver them as periodical preamble signals that make a detour around the power amplification and transmission block 50 at the time of broadcasting the preamble signals. For example, referring to FIG. 2, the switching block 30 may receive the power signals distributed from the power distribution and control block 10 and then deliver them as the periodical preamble signals in accordance with control of the power distribution and control block 10. The preamble signals in the present invention are not power signals for wireless power transmission but a kind of pulse width modulation (PWM) signals for determining whether wireless power receiving apparatuses (not shown) appear on transmission coils 71, 72, and 73, and may have shorter high intervals and longer low intervals for reducing power consumption. On the other hand, the power signals are ones for wireless power transmission to supply power, and may have extremely longer high intervals and extremely shorter low intervals than the preamble signals.

In addition, when a preamble signal broadcast mode is switched to a power signal transmission mode for each path, the switching block 30 that has received the power signals distributed from the power distribution and control block 10 may deliver the power signals to the power amplification and transmission block 50 on respective paths in accordance with switching of the switches.

Controlling the switching block 30 may be performed by the power distribution and control block 10, for example, by the signal adjustment unit 15 shown in FIG. 2. In accordance with control of the power distribution and control block 10, for example, in accordance with control of the signal adjustment unit 15, the switching block 30 may deliver the preamble signals in the preamble signal broadcast mode or may transmit the power signals received on the paths to be changed to the wireless power transmission mode to the power amplification and transmission block 50, whereby wireless power transmission may be performed.

In a detailed method, the switching block 30 delivers the periodical preamble signals in the preamble signal broadcast mode at first. Here, the switching block 30 delivers the preamble signals by making a detour around the power amplification and transmission block 50.

In the paths where the wireless power receiving apparatuses (not shown) appear in accordance with sensing results of the sensing block 90 that will be described next while the preamble signals are broadcast, the preamble signal broadcast mode is switched to the wireless power transmission mode, so that the switches 31, 32 and 33 of the switching block 30 on the corresponding paths deliver the received power signals to the power amplification and transmission block 50.

Referring to FIG. 2, the switching block 30 receives the power signals distributed from the power distribution and control block 10. Here, for example, a driving amplification block 20, which amplifies the power signals distributed from the power distribution and control block 10 and transmits the amplified power signals to the switching block 30, may be disposed between the power distribution and control block 10 and the switching block 30.

The driving amplification block has driving amplifiers 21, 22 and 23 on the respective paths. The driving amplifiers 21, 22 and 23 on the respective paths allow the power signals to have high gains in the previous stage and then be delivered to power amplifiers 151, 152 and 153 of the power amplification and transmission block 50 in the next stage, whereby the power amplifiers 151, 152 and 153 of the next stage may properly perform power amplification. Here, the driving amplifiers 21, 22 and 23 may act to compensate for gains in the previous stage of the power amplifiers 151, 152 and 153.

In radio frequency (RF) transmission, signals should be transmitted with high power via antennas, however, it is difficult to satisfy both gain and power due to a structural problem of the amplifier. Accordingly, separate driving amplifiers 21, 22 and 23 having high gains are disposed in the stage prior to power amplification to deliver the signals with high gains to the next stage, so that the power amplification may be properly performed. Here, in the present embodiment, the switching block 30 is disposed between the driving amplification block 20 of the previous stage and the power amplification block 150 of the next stage on the paths. Accordingly, the power signals for wireless power transmission have gains increased by the driving amplifiers 21, 22 and 23 of the driving amplification block 20 and then are amplified with high power by the power amplification block 150, and the preamble signals for detecting whether the wireless power receiving apparatuses (not shown) appear make a detour around the power amplification and transmission block 50 by means of the switches 31, 32 and 33 of the switching block 30 disposed between the driving amplifiers 21, 22 and 23 of the driving amplification block 20 and the power amplification block 150, so that the efficiency is enhanced.

Referring to FIGS. 1 and 2 again, the power amplification and transmission block 50 may amplify the power signals received through the switching block 30 on the respective paths and transmit the amplified power signals to the coil array block 70. Referring to FIG. 2, the power amplification and transmission block 50 may include a structure in which the power amplifiers 151, 152 and 153 and matching circuits 251, 252 and 253 are coupled to each other on the paths, respectively.

Referring to FIG. 2, for example, the power amplification and transmission block 50 may include the power amplification block 150 and a matching circuit block 250. The power amplification block 150 includes the power amplifiers 151, 152 and 153 disposed on the respective paths. The power amplifiers 151, 152 and 153 amplify and deliver the power signals received through the switches 31, 32 and 33 of the switching block 30 on the paths, respectively. Here, referring to FIG. 2, for example, the power amplification block 150 may receive, through the switching block 30, the signals that are already amplified with a high gain by the driving amplification block 20 disposed in the previous stage of the switching block 30 and then amplify the signals with a high power.

Here, the power amplification block 150 is matched not to a minimum reflection point but to a maximum power output point for delivering a maximum power, so that the power amplification block may have a structure mismatched to loads of the transmission coils 71, 72 and 73 that receive the amplified power signals. Accordingly, in order to transmit the power with a minimum loss between the power amplification block 150 of the input stage and the coil array block 70 of the output stage, the matching circuit block 250 for impedance matching between the input stage and the output stage may be included.

In FIG. 2, the matching circuit block 250 includes the matching circuits 251, 252 and 253 disposed on the respective paths. The matching circuits 251, 252 and 253 transmit the signals with a low loss that is amplified by the power amplifiers 151, 152 and 153 to the transmission coils 71, 72 and 73 of the coil array block 70 on the paths, respectively.

Next, referring to FIGS. 1 and 2, the sensing block 90 detects the preamble signals that make a detour around the power amplification and transmission block 50 and are delivered to the coil array block 70 on the respective paths. Here, the sensing block 90 may detect changes in preamble signals depending on whether the wireless power receiving apparatuses (not shown) receiving the wireless power from the coil array block 70 appear. Referring to FIG. 2, the sensing block 90 may have sensing circuits 91, 92 and 93 on the respective paths to rapidly detect whether the wireless power receiving apparatuses (not shown) appear. Results sensed by the sensing block 90 are delivered to the signal adjustment unit 15 of the power distribution and control block 10.

In accordance with the embodiment of the present invention, the periodical preamble signals may be broadcast in the sleep mode that maintains the minimum power in the wireless power transmission apparatus to rapidly detect whether the wireless power receiving apparatuses (not shown) appear.

In addition, referring to FIGS. 1 and 2, for example, the sensing block 90 may have the sensing circuits 91, 92 and 93 disposed on the paths, which are common to paths for the preamble signals that make a detour around the power amplification and transmission block 50 and are delivered to the coil array block 70 and paths for the power signals amplified by the power amplification and transmission block 50 and delivered to the coil array block 70. Accordingly, the sensing circuits 91, 92 and 93 of the sensing block 90 may detect changes in preamble signals or power signals which are delivered to the coil array block 70 on the respective paths.

That is, at the time of broadcasting the preamble signals, the sensing block 90 may detect the level changes in preamble signals that make a detour around the power amplification and transmission block 50 and are delivered to the coil array block 70 through the respective paths. When the power signals are delivered to the coil array block 70 via the power amplification and transmission block 50 through the paths that are switched to the wireless power transmission mode in accordance with the level changes in preamble signals, the sensing block 90 may detect the level changes in power signals. Here, the level changes in preamble signals or power signals detected on the respective paths occur because of the wireless power receiving apparatus (not shown) receiving the wireless power through the transmission coils 71, 72 and 73 of the coil array block 70 on the corresponding paths. Accordingly, the level changes in such preamble signals may be detected on the respective paths to determine whether the wireless power receiving apparatuses (not shown) appear. Further, for example, the level changes in power signals may be detected to determine the reception state or charge progress state of the wireless power receiving apparatus (not shown).

Next, the power distribution and control block 10 will be described with reference to FIGS. 1 and 2.

The power distribution and control block 10 controls the preamble signals to be periodically transmitted to the respective paths through the switching block 30 at the time of broadcasting the preamble signals. The power distribution and control block 10 may control the switching block 30 on the paths where the wireless power receiving apparatuses (not shown) appear to transmit the power signals to the power amplification and transmission block 50 in accordance with sensing results received from the sensing block 90. Here, the power distribution and control block 10 may determine the paths where the wireless power receiving apparatuses (not shown) appear based on the sensing results, turn on the switches 31, 32 and 33 of the switching block on the corresponding paths, and have the distributed power signals transmitted to the power amplification and transmission block 50 through the switching block 30 and then amplified by the power amplification and transmission block 50.

Although not clearly shown, referring to FIG. 2, for example, the power distribution and control block 10 may include a power distributor and the signal adjustment unit 15.

The power distributor (not shown) distributes the powers of the power source and transmits the distributed powers to the switches 31, 32 and 33 of the switching block 30 on the respective paths. For example, the power distributor may be configured to have distribution resistances on the respective paths. Although not shown, a rectifier for rectifying alternating currents (ACs) of the power source may be disposed in front of the power distributor. Referring to FIG. 2, for example, powers distributed by the power distributor may be input to the switches 31, 32 and 33 of the switching block 30 through the driving amplifiers 21, 22 and 23 of the driving amplification block 20 on the respective paths.

Next, the signal adjustment unit 15 will be described with reference to FIG. 2. The signal adjustment unit 15 may control the power signals distributed from the power distributor to be transmitted through the switching block 30 as the preamble signals that make a detour around the power amplification and transmission block 50 at the time of broadcasting the initial preamble signals. That is, power consumption is large when the power signals for wireless power transmission are amplified directly from the initial stage and then wirelessly transmitted through the transmission coils 71, 72 and 73. Accordingly, the preamble signals may be transmitted such that powers are wirelessly and intensively transmitted only through the paths of the transmission coils 71, 72 and 73 where the wireless power receiving apparatuses (not shown) appear among the coil arrays, so that the efficiency may be enhanced.

The signal adjustment unit 15 receives the level changes in preamble signals on the respective paths detected by the sensing block 90 in accordance with the broadcast preamble signals. First, control of the signal adjustment unit 15 on the sensed paths where the wireless power receiving apparatuses (not shown) appear based on the sensing results of the sensing block 90 will be described in detail. Here, the signal adjustment unit 15 may control the switches 31, 32 and 33 of the switching block 30 on the paths where the wireless power receiving apparatuses (not shown) appear based on the sensing results of the level changes in preamble signals on the respective paths, for example, may turn on the switches 31, 32 and 33 for power input such that the power signals are transmitted to the power amplification and transmission block 50 through the corresponding paths.

Here, for example, the signal adjustment unit 15 may be switched to the wireless power transmission mode by turning on the switches 31, 32 and 33 for power input on the paths where the wireless power receiving apparatuses (not shown) appear and a bias power source for power amplification of the power amplification and transmission block 50 in accordance with the sensing results of the broadcast preamble signals.

In addition, for example, a case in which the power signals for wireless power transmission are transmitted through the paths switched to the wireless power transmission mode will be further described. Here, when the power signals distributed by the power distributor are amplified with amplification gains by the driving amplifiers 21, 22 and 22 and then transmitted to the power amplification and transmission block 50 through the switches 31, 32 and 33 of the switching block 30 in FIG. 2, the power signals are amplified with high powers by the power amplifiers 151, 152 and 153 and transmitted to the transmission coils 71, 72 and 73 of the coil array block 70 disposed at the final stage of the corresponding paths through the matching circuits 251, 252 and 253 in order to reduce the loss during the transmission, which may then be transmitted to reception coils of the wireless power receiving apparatus (not shown). Here, the level changes in power signals transmitted to the transmission coils 71, 72 and 73 are detected by the sensing block 90 on the paths from the power amplification and transmission block 50 to the coil array block 70. In accordance with the level changes of the power signals detected by the sensing block 90, the signal adjustment unit 15 may determine the power transmission state of the transmission coils 71, 72 and 73 through the corresponding paths, the power reception state of the wireless power receiving apparatus (not shown), or the wireless charging progress state such as whether charging is completed. The signal adjustment unit 15 may determine the charge progress state of the wireless power receiving apparatuses (not shown) on the corresponding paths in accordance with the changes in power signals detected by the sensing block 90 with respect to the paths switched to the wireless power transmission mode, and may be switched to the sleep mode by turning off the switches 31, 32 and 33 for power input of the switching block 30 and the bias power source for power amplification of the power amplification and transmission block 50 on the corresponding paths at the time of charge completion. When the mode is switched to the sleep mode, for example, the switches 31, 32 and 33 of the switching block 30 on the corresponding paths may deliver the preamble signals by periodically making a detour around the power amplification and transmission block 50 under control of the signal adjustment unit 15.

Next, control of the signal adjustment unit 15 on the paths where the wireless power receiving apparatuses (not shown) do not appear in accordance with the sensing results will be described. The signal adjustment unit 15 may control the power signals for wireless power transmission not to be transmitted through the paths where the wireless power receiving apparatuses (not shown) do not appear in accordance with the sensing results of the level changes in preamble signals on the respective paths. That is, the signal adjustment unit 15 may control the switches 31, 32 and 33 of the switching block 30 on the paths where the wireless power receiving apparatuses (not shown) do not appear, for example, may turn off the switches 31, 32 and 33 for power input to prevent the power signals from being transmitted to the power amplification and transmission block 50 on the corresponding paths.

Here, for example, the signal adjustment unit 15 may maintain the sleep mode by turning off the switches 31, 32 and 33 of the switching block 30 on the paths where the wireless power receiving apparatuses (not shown) do not appear and the bias power source for power amplification of the power amplification and transmission block 50 in accordance with the sensing results of the broadcast preamble signals.

In addition, for example, the signal adjustment unit 15 may control the preamble signals to make a detour around the power amplification and transmission block 50 and be transmitted through the switching block 30 while turning off the switches 31, 32 and 33 for power input of the switching block 30 on the paths where the wireless power receiving apparatuses (not shown) do not appear in accordance with the sensing results of the broadcast preamble signals. Accordingly, for example, periodical preamble signals may be continuously provided to the paths where the wireless power receiving apparatuses (not shown) do not appear until the wireless power receiving apparatuses (not shown) appear on the transmission coils 71, 72 and 73 of the corresponding paths.

Still another embodiment of the present invention will be described. For example, the signal adjustment unit 15 may assign temporary identifiers (IDs) to the coil array block 70, determine the sensing results of the broadcast preamble signals using the respective temporary IDs, and have a display apparatus (not shown) display whether the mode needs to be switched to the wireless power transmission mode.

In addition, the signal adjustment unit 15 may control the display apparatus (not shown) to display the reception state or charge progress state of the wireless power receiving apparatuses in accordance with the results sensed for each of the temporary IDs with respect to the paths switched to the wireless power transmission mode.

According to embodiments of the present invention, the wireless power transmission apparatus may assign the temporary IDs to the transmission coils 71, 72 and 73 of the multi-coil array, and may check the state of a wireless power receiving apparatus (not shown) for each of the temporary IDs to display the charge profile as number or graph. Here, priorities may be arbitrarily given to wireless charging terminals that are the wireless power receiving apparatuses to perform the power transmission on the corresponding paths. When the state is switched to the charge completion state by virtue of the determination on the reception state of the wireless power receiving apparatus (not shown), biases of the power amplifiers 151, 152 and 153 of the power amplification and the transmission block 50 of the wireless power transmission apparatus may be turned off to reduce unnecessary power consumption. For example, when a wireless multi-charging set is installed in a predetermined space such as café or public institution, the charge state of each wireless power reception terminal may be displayed.

Yet another embodiment will be described with reference to FIGS. 1 and 2. For example, the wireless power transmission apparatus includes the coil array block 70. The coil array block 70 has the transmission coils 71, 72 and 73 on the respective paths. The coil array block 70 wirelessly transmits the power signals received from the power amplification and transmission block 50 through the respective paths to the wireless power receiving apparatus (not shown). Here, the level changes in power signals transmitted to the transmission coils 71, 72 and 73 of the coil array block 70 may be detected by the sensing circuits 91, 92 and 93.

The coil array block 70 may not only wirelessly transmit the power signals but also wirelessly transmit the preamble signals received by making a detour around the power amplification and transmission block 50 to reception coils of the wireless power receiving apparatuses (not shown) through the transmission coils 71, 72 and 73 at the time of broadcasting the preamble signals. Here, the level changes in preamble signals transmitted to the transmission coils 71, 72 and 73 of the coil array block 70 may be detected by the sensing circuits 91, 92 and 93.

For example, the transmission coils 71, 72 and 73 of the coil array block 70 may supply the wireless power to the reception coils of the wireless power receiving apparatuses (not shown) by means of electromagnetic induction.

Here, for example, the coil array block 70 may have the transmission coils 71, 72, 73 which are electromagnetically coupled with the reception coils of the wireless power receiving apparatuses (not shown) on the respective paths, so that the power signals may be wirelessly transmitted.

Next, the method of transmitting wireless power according to a second embodiment of the present invention will be described in detail. Here, not only FIG. 3 but also the apparatuses for transmitting wireless power according to the first embodiment described above and FIGS. 1 and 2 will be referred to, so that the overlapping descriptions thereof may be omitted.

Figure 3:
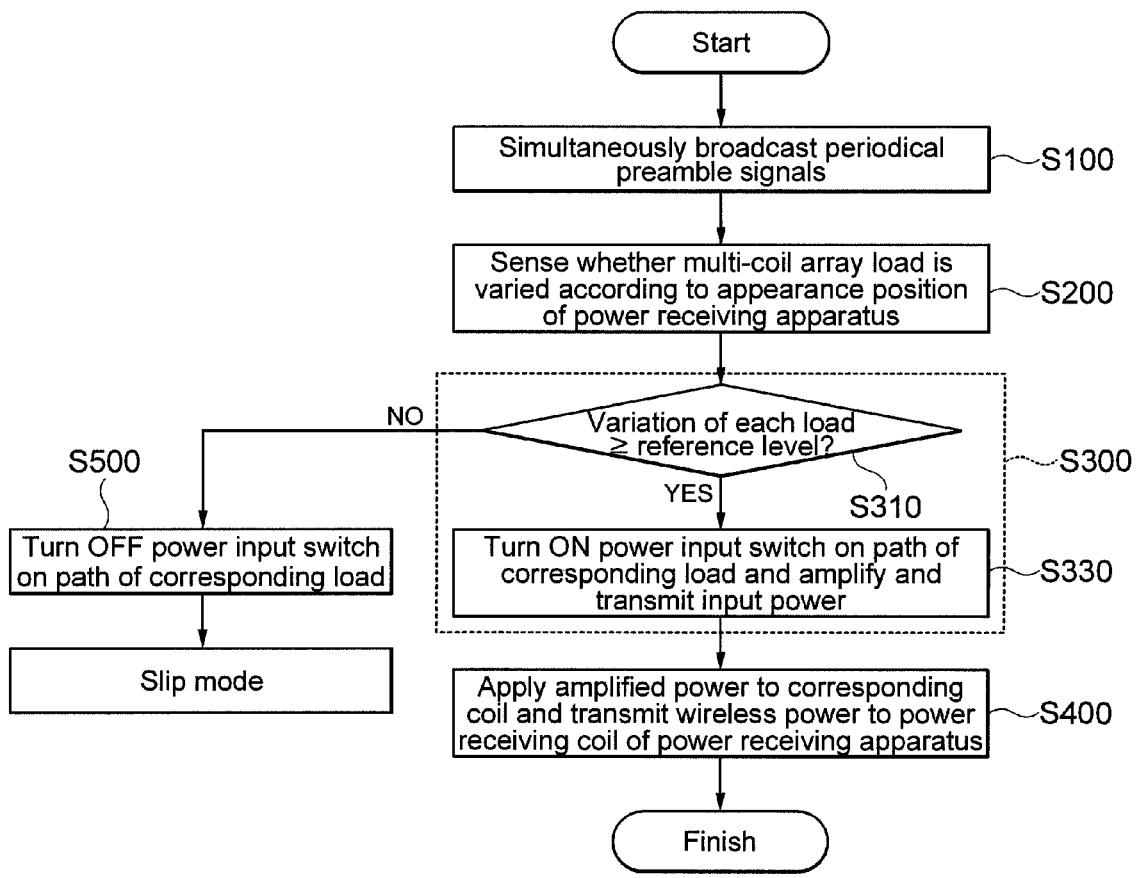
FIG. 3 is a flow chart schematically illustrating a method of transmitting wireless power in accordance with an embodiment of the present invention.

FIG. 3 is a flow chart schematically illustrating a method of transmitting wireless power in accordance with yet another embodiment of the present invention.

Referring to FIG. 3, the method of transmitting wireless power according to yet another embodiment of the present invention may include the following steps (a) to (d).

In FIG. 3, in step (a) (S100), the distributed power signals, under control, may be input to the switching block 30 having the switches 31, 32 and 33 and transmitted as periodical preamble signals through detour paths making a detour around the power amplification paths. This step (S100) is one for periodically broadcasting the preamble signals in the switching block 30 under control of the signal adjustment unit 15.

For example, although not shown, step (a-0) prior to step (a) mentioned above may be further included. Here, in step (a-0), the power signals distributed from the power source, under control, may be transmitted to the switches 31, 32 and 33 of the switching block 30 on the respective paths.

Meanwhile, referring to FIG. 2, for example, amplifying the power signals with the driving amplifiers 21, 22 and 23 may be further included before the power signals are input to the switches 31, 32 and 33 of the switching block 30 in step (a).

When the preamble signals make a detour around the power amplification paths and are delivered, the preamble signals delivered to the coil array block 70 having the transmission coils 71, 72 and 73 for wireless power transmission through the detour paths are detected in step (b) (S20) as shown in FIG. 3. Here, the changes in preamble signals may be sensed depending on whether the wireless power receiving apparatuses (not shown) receiving the wireless power from the coil array block 70 appear (S200).

Next, referring to FIG. 3, in step (c) (S300), the switching block 30 on the paths where the wireless power receiving apparatuses (not shown) appear is controlled in accordance with the changes in sensed preamble signals. Accordingly, the power signals input to the switching block 30 are transmitted to the power amplification paths and amplified, and are then transmitted to the coil array block 70 (S300).

In another example, when the switching block 30 on the paths where the wireless power receiving apparatuses (not shown) appear is controlled and the power signals are transmitted through the power amplification paths in step (c), the power signals input to the switching block 30 may go through the next step (a-0). In particular, in step (a-0), the power signals distributed from the power source, under control, may be transmitted to the switches 31, 32 and 33 of the switching block 30 on the respective paths.

Meanwhile, referring to FIG. 2, in another example, a step of driving-amplifying the power signals with the driving amplifiers 21, 22 and 23 may be further included before the power signals are input to the switches 31, 32 and 33 of the switching block 30 in step (c).

In another example, the power amplification and transmission in step (c) (S300, S330) mentioned above may include the following steps (c-1) and (c-2). In steps (c-1) and (c-2), the power signals are transmitted to and amplified in the paths where the wireless power receiving apparatuses (not shown) appear in accordance with the sensed results of the broadcast preamble signals, which are then transmitted to the coil array block 70 (S330).

In a detailed method, the power signals transmitted from the switches 31, 32 and 33 of the switching block 30 on the respective paths to the power amplification paths may be amplified by the power amplifiers 151, 152 and 153 on the respective paths in step (c-1).

Next, in step (c-2), the amplified signals with a low loss may be transmitted to the coil array block 70 through the matching circuits 251, 252 and 253 on the respective paths.

Step (c) mentioned above with reference to FIG. 3 will be further described. In particular, step (c) mentioned above, for example, may include the following steps (c1) and (c2).

Here, in step (c1) (S300, S330), the switches 31, 32 and 33 of the switching block 30 on the paths where the wireless power receiving apparatuses (not shown) appear are controlled in accordance with the changes in sensed preamble signals. In accordance with the control of the switches 31, 32 and 33 of the switching block 30, for example, the switches 31, 32 and 33 are turned on, and the power signals delivered through the switches 31, 32 and 33 are transmitted to the power amplification paths through the corresponding paths.

In another example, in step (c1) (S300, S330) mentioned above, the mode may be switched to the wireless power transmission mode when the switches 31, 32 and 33 for power input of the switching block 30 on the paths where the wireless power receiving apparatuses (not shown) appear and the bias power source for power amplification on the power amplification paths are turned on. Since the mode is switched to the wireless power transmission mode, the power signals may be amplified in the power amplification paths and then transmitted through the corresponding paths, so that the power signals may be wirelessly transmitted in the coil array block 70.

In another example, in step (c1) mentioned above, the following steps (c1-a), (c1-b) and (c1-c) may be performed on the paths switched to the wireless power transmission mode.

In step (c1-a), since the mode is switched to the wireless power transmission mode, the distributed power signals may be input to the switching block 30 having the switches 31, 32 and 33 and transmitted to the power amplification paths.

Next, in step (c1-b), the power signals delivered to the coil array block 70 having the transmission coils 71, 72 and 73 through the power amplification paths may be detected, and the changes in power signals may be detected in accordance with the reception state of the wireless power receiving apparatuses (not shown) receiving the wireless power from the coil array block 70 on the corresponding paths.

In step (c1-c), the charge progress state of the wireless power receiving apparatuses (not shown) on the corresponding paths is determined in accordance with the changes in sensed power signals, and the mode may be switched to the sleep mode by turning off the switches 31, 32 and 33 for power input of the switching block 30 on the corresponding paths and the bias power source for power amplification on the power amplification paths at the time of charge completion.

For example, in step (c) mentioned above, whether the mode needs to be switched to the wireless power transmission mode may be displayed in step (c1) mentioned above using the sensed results of the broadcast preamble signals for each of the temporary IDs assigned to the coil array block 70.

In addition, the reception state or the charge progress state of the wireless power receiving apparatus according to the changes in power signals sensed for each of the temporary IDs in step (c1-c) mentioned above may be displayed with respect to the paths switched to the wireless power transmission mode in step (c1) mentioned above.

Accordingly, unlike prior arts in which the appearance of the receiving apparatuses is sequentially detected, the IDs are assigned to the transmission coils 71, 72 and 73 on the respective paths through the broadcast preamble signals, determination on the presence of the wireless power receiving apparatuses (not shown), charge profile information of each wireless power receiving apparatus, and so forth are managed in accordance with the IDs, and the current charge state and the expected time of charge completion are additionally displayed, so that the wireless charging system may be effectively operated.

Next, in step (c2) (S500), the switches 31, 32 and 33 of the switching block 30 on the paths where the wireless power receiving apparatuses (not shown) do not appear may be controlled in accordance with the changes in sensed preamble signals, so that the power signals may be prevented from being transmitted to the power amplification paths.

In another example, in step (c2) (S500) mentioned above, the sleep mode may be maintained by turning off the switches 31, 32 and 33 for power input of the switching block 30 on the paths where the wireless power receiving apparatuses (not shown) do not appear and the bias power source for power amplification on the power amplification paths.

Here, for example, in step (c2) (S500) mentioned above, the switches 31, 32 and 33 for power input of the switching block 30 on the paths where the wireless power receiving apparatuses (not shown) do not appear may be kept in an off state while the preamble signals are transmitted through the switching block 30 by making a detour around the power amplification paths.

Referring to FIG. 3 again, in step (d) (S400), wireless power transmission is performed by the coil array block 70 that has received the power signals.

In another example, the coil array block 70 may supply the wireless power to the wireless power receiving apparatus (not shown) by virtue of electromagnetic induction.

As can be seen from the foregoing, according to the embodiments of the present invention, determination of several wireless power receiving apparatuses may be rapidly made with respect to the wireless power transmission apparatus using a multi-coil array, and power consumption may be minimized by efficiently operating the wireless power transmission apparatus.

For example, according to the embodiments of the present invention, the presence of the wireless power receiving apparatus may be rapidly determined by broadcasting periodical preamble signals in a sleep mode that keeps the minimum power in the wireless power transmission apparatus.

In addition, according to an embodiment of the present invention, unlike the case of transmitting power signals for wireless power transmission, power amplification may be omitted at the time of transmitting the preamble signals for determining the presence of the wireless power receiving apparatus, so that power consumption may be minimized.

It is obvious that various effects that are directly indicated may be derived from various configurations according to embodiments of the present invention by those skilled in the art in accordance with various embodiments of the present invention.

Embodiments of the invention have been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

What is claimed is:

1. A wireless power transmission apparatus, comprising:
a switching block having a plurality of switches, receiving distributed power signals, and delivering the power signals as periodical preamble signals that make a detour around a power amplification and transmission block or delivering the power signals to the power amplification and transmission block in accordance with switching under control;
the power amplification and transmission block amplifying the power signals received through the switching block on respective paths and transmitting the amplified power signals to a coil array block;
a sensing block detecting the preamble signals on the respective paths that make a detour around the power amplification and transmission block and are delivered to the coil array block, and sensing changes in the preamble signals according to whether wireless power receiving apparatuses receiving a wireless power from the coil array block appear; and
a power distribution and control block controlling the preamble signals to be periodically transmitted to the respective paths through the switching block, and controlling the switching block, on the paths where the wireless power receiving apparatuses appear, according to sensing results received from the sensing block to transmit the power signals to the power amplification and transmission block.

2. The apparatus of claim 1, further comprising:
a driving amplification block disposed between the power distribution and control block and the switching block for amplifying and transmitting the power signals distributed from the power distribution and control block.

3. The apparatus of claim 1, further comprising:
a coil array block wirelessly transmitting, to the wireless power receiving apparatuses, the power signals received from the power amplification and transmission block and the received preamble signals that make a detour around the power amplification and transmission block.

4. The apparatus of claim 3, wherein the coil array block includes a plurality of transmission coils, and the transmission coils are electromagnetically coupled with reception coils of the wireless power receiving apparatuses on the respective paths to wirelessly transmit the power signals.

5. The apparatus of claim 1, wherein the power amplification and transmission block comprises:
a plurality of power amplifiers that amplify the power signals received through the switches of the switching block on the respective paths; and
a plurality of matching circuits that transmit, with a low loss, the power signals amplified by the respective power amplifiers to the coil array block through the respective paths.

6. The apparatus of claim 1, wherein the power distribution and control block includes:
a power distributor that distributes powers of a power source and transmits the powers to the switches of the switching block on the respective paths; and
a signal adjustment unit controlling the power signals distributed from the power distributor to be transmitted as the preamble signals that make a detour around the power amplification and transmission block through the switching block at the time of initially broadcasting the preamble signals, controlling the switches of the switching block, on the paths where the wireless power receiving apparatuses appear, to transmit the power signals distributed from the power distributor to the power amplification and transmission block through the corresponding paths in accordance with the sensing results received from the sensing block, and controlling the switches of the switching block, on the paths where the wireless power receiving apparatuses do not appear, to prevent the power signals from being transmitted to the power amplification and transmission block through the corresponding paths.

7. The apparatus of claim 6, wherein the signal adjustment unit switches to a wireless power transmission mode by turning on the switches for power input of the switching block on the paths where the wireless power receiving apparatuses appear and a bias power source for power amplification of the power amplification and transmission block, and maintains a sleep mode by turning off the switches for power input of the switching block on the paths where the wireless power receiving apparatuses do not appear and the bias power source for power amplification of the power amplification and transmission block, in accordance with the sensing results from the broadcast preamble signals.

8. The apparatus of claim 7, wherein the signal adjustment unit controls the preamble signals to make a detour around the power amplification and transmission block through the switching block and to be transmitted while keeping the switches for power input of the switching block on the paths where the wireless power receiving apparatuses do not appear in an off state in accordance with the sensing results from the broadcast preamble signals.

9. The apparatus of claim 7, wherein the sensing block is disposed on each path that are common to the paths of the preamble signals that make a detour around the power amplification and transmission block and are delivered to the coil array block and the paths of the power signals that are amplified by the power amplification and transmission block and delivered to the coil array block, and detects the changes in preamble signals or power signals delivered to the coil array block on the respective paths, and
the signal adjustment unit determines the charge progress state of the wireless power receiving apparatuses on the corresponding paths in accordance with the changes in power signals detected by the sensing block with respect to the paths switched to the wireless power transmission mode, and switches to the sleep mode by turning off the switches for power input of the switching block on the corresponding paths and the bias power source for power amplification of the power amplification and transmission block at the time of charge completion.

10. The apparatus of claim 9, wherein the signal adjustment unit assigns temporary identifiers (IDs) to the coil array block, determines the sensing results of the broadcast preamble signals for each of the temporary IDs and controls a display apparatus to display whether the mode needs to be switched to the wireless mode transmission mode, and controls the display apparatus to display the reception state or charge progress state of the wireless power receiving apparatuses in accordance with the sensing results for each of the temporary IDs with respect to the paths switched to the wireless power transmission mode.

11. A method of transmitting wireless power, comprising:
  (a) inputting, under control, distributed power signals to a switching block having a plurality of switches, and transmitting the power signals as periodical preamble signals on detour paths that make a detour around power amplification paths;
  (b) detecting the preamble signals that are delivered to a coil array block having transmission coils for wireless power transmission through the detour paths, and sensing changes in preamble signals in accordance with whether wireless power receiving apparatuses receiving the wireless power from the coil array block appear;
  (c) controlling the switching block on the paths where wireless power receiving apparatuses appear, in accordance with the changes in sensed preamble signals, transmitting the power signals input to the switching block to the power amplification paths, amplifying the power signals on the power amplification paths, and transmitting the amplified power signals to the coil array block; and
  (d) performing, by the coil array block, wireless power transmission.

12. The method of claim 11, further comprising:
  driving-amplifying the power signals before the power signals are input to the switches of the switching block in (a) and (c).

13. The method of claim 11, wherein amplifying and transmitting the power signals in (c) includes:
  (c-1) amplifying, by power amplifiers on the respective paths, the power signals transmitted from the switches of the switching block on the respective paths to the power amplification paths; and
  (c-2) transmitting the amplified signals with a low loss to the coil array block through matching circuits on the respective paths.

14. The method of claim 11, further comprising:
  (a-0) transmitting the power signals distributed from a power source to the switches of the switching block on the respective paths, wherein (c) includes:
  (c1) controlling the switches of the switching block, on the paths where the wireless power receiving apparatuses appear, to transmit the power signals to the power amplification paths through the corresponding paths, in accordance with the changes in sensed preamble signals; and
  (c2) controlling the switches of the switching block, on the paths where the wireless power receiving apparatuses do not appear, to prevent the power signals from being transmitted to the power amplification paths, in accordance with the changes in sensed preamble signals.

15. The method of claim 14, wherein in (c1), a mode is switched to a wireless power transmission mode by turning on the switches for power input of the switching block on the paths where the wireless power receiving apparatuses appear and a bias power source for power amplification on the power amplification paths, and
  in (c2), a sleep mode is maintained by turning off the switches for power input of the switching block on the paths where the wireless power receiving apparatuses do not appear and the bias power source for power amplification on the power amplification paths.

16. The method of claim 15, wherein in (c2), the switches for power input of the switching block on the paths where the wireless power receiving apparatuses do not appear are kept in an off state while the preamble signals make a detour around the power amplification paths through the switching block and are transmitted.

17. The method of 15, wherein (c1) includes:
  with respect to the paths switched to the wireless power transmission mode,
  (c1-a) inputting the distributed power signals to the switching block having the switches and transmitting the power signals to the power amplification paths in accordance with switching to the wireless power transmission mode;
  (c1-b) detecting the power signals delivered to the coil array block having the transmission coils through the power amplification paths, and sensing the changes in power signals in accordance with the reception state of the wireless power receiving apparatuses receiving the wireless power from the coil array block on the corresponding paths; and
  (c1-c) determining the charge progress state of the wireless power receiving apparatuses on the corresponding paths in accordance with the changes in sensed power signals, and switching to the sleep mode by turning off the switches for power input of the switching block on the corresponding paths and the bias power source for power amplification on the power amplification paths at the time of charge completion.

18. The method of claim 17, wherein in (c), the sensing results of the broadcast preamble signals for each of temporary IDs assigned to the coil array block are determined to display whether the mode needs to be switched to the wireless power transmission mode in (c1), and the reception state or charge progress state of the wireless power receiving apparatuses according to the changes in sensed power signals for each of the temporary IDs in (c1-c) is displayed with respect to the paths switched to the wireless power transmission mode in (c1).

* * * * *